United States Patent [19]

Bivens et al.

[11] Patent Number: 5,359,326
[45] Date of Patent: Oct. 25, 1994

[54] AIRCRAFT MANEUVER ENVELOPE WARNING SYSTEM

[75] Inventors: Courtland C. Bivens, San Jose; Joel M. Rosado, Sunnyvale; Burnett Lee, San Mateo, all of Calif.

[73] Assignee: The United States of America as represented by the Administrator of National Aeronautics and Space Administration, Washington, D.C.

[21] Appl. No.: 32,067

[22] Filed: Mar. 16, 1993

[51] Int. Cl.$^5$ ............................................. G01C 21/00
[52] U.S. Cl. .................................. 340/971; 340/945; 340/978
[58] Field of Search ............... 340/945, 946, 959, 960, 340/963, 964, 969, 970, 971, 978, 984, 987, 438, 441, 464; 116/202; 364/424.06, 424.01; 123/630, 198 D; 73/178 H

[56] References Cited

U.S. PATENT DOCUMENTS

| | | | |
|---|---|---|---|
| 3,188,861 | 6/1965 | Miller | 340/959 |
| 3,355,706 | 11/1967 | Pitches | 340/964 |
| 3,774,152 | 11/1973 | Tandy | 340/464 |
| 3,906,437 | 9/1975 | Brandwein et al. | 340/945 |
| 4,027,838 | 6/1977 | Barnum et al. | 73/178 H |
| 4,415,974 | 11/1983 | Laug et al. | 340/969 |
| 4,507,657 | 3/1985 | Bates | 340/959 |
| 4,763,285 | 8/1988 | Moore et al. | 73/178 H |
| 4,870,412 | 9/1989 | Vuichard | 340/946 |
| 4,949,067 | 8/1990 | Martell | 340/905 |
| 4,980,684 | 12/1990 | Paterson | 340/970 |
| 5,150,098 | 9/1992 | Rakow | 340/464 |

Primary Examiner—Brent Swarthout
Attorney, Agent, or Firm—Guy Miller; Ken Warsh; John R. Manning

[57] ABSTRACT

A maneuver envelope warning system for an aircraft having operating limits, operating condition sensors and an indicator driver. The indicator driver has a plurality of visual indicators. The indicator driver determines a relationship between sensed operating conditions and the operating limits; such as, a ratio therebetween. The indicator driver illuminates a number of the indicators in proportion to the determined relationship. The position of the indicators illuminated represents to a pilot in an easily ascertainable manner whether the operational conditions are approaching operational limits of the aircraft, and the degree to which operational conditions lie within or exceed operational limits.

1 Claim, 5 Drawing Sheets

AIRCRAFT MANEUVER ENVELOPE WARNING SYSTEM

ORIGIN OF THE INVENTION

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION a. Technical Field of the Invention

The present invention relates to a warning system for an aircraft; and, in particular, to a warning system capable of operating during air-to-air combat maneuvers so that operational limitations of the aircraft will not be exceeded unintentionally due to the pilot's attention being directed outside the cockpit to a threat target or for terrain avoidance and navigation.

b. Description of the Prior Art

Typically, pilots were required to look at the air speed indicator, G-meter, and the engine gauges and mentally compare the readings to operational limitations memorized from technical manuals in order to maintain the aircraft within operational limits. The problems associated with these display instruments include: (1) The gauges were among numerous other instruments in the overall cockpit display. Typically, during air-to-air combat maneuvering, a pilot could not devote the attention required to get the necessary readings from these instruments. (2) The pilot had to assimilate information from several gauges in order to determine if any one specific operational limit had been exceeded, and the pilot generally had to make this assimilation in a very small amount of time. (3) Many of the gauges were imprecise or hard to read. (4) The pilot had to memorize numerous operation limitations.

To simplify the pilot's assimilation of operational conditions for a vehicle, warning systems have been developed which compare numerous monitored operational conditions to operational limits of the vehicle. Based on the comparison, a visual alarm, or an audible alarm, or both are given. However, the visual alarm of these warning systems consists of a flashing light. U.S. Pat. Nos. 4,027,838, 4,763,285, 4,870,412, and 4,980,684 are representative of these conventional warning systems. These conventional warning systems fail to indicate simultaneously to the pilot in a simple and easily assimilated manner whether multiple operational conditions are approaching the operational limits. Furthermore, these conventional warning systems do not indicate the degree, in a dynamic sense, to which operational conditions are within or exceed operational limits.

SUMMARY OF THE INVENTION

An object of the present invention is to provide a warning system for aircraft which can be easily assimilated by a pilot.

Another object of the present invention is to provide a warning system that indicates whether the aircraft operational conditions are approaching operational limits and the degree to which these operational conditions lie within or exceed operational limits.

A further object of the present invention is to provide a warning system that does not require the use of a pilot's central vision, improves the economies of space for an aircraft instrument panel, and consequently simplifies the overall engineering design of an aircraft cockpit configuration panel.

To achieve the above and other objects, the present invention provides a maneuver envelope warning system for a flight vehicle that has vehicle operating limits and that includes a sensor means and indicating means. The sensor means senses any required measurable operational conditions of the vehicle; such as, forward velocity, sideslip velocity and vertical acceleration. The definition of such would depend on the specific application. The indicating means has a plurality of indicators and determines a relationship between the sensed operating conditions and the operating limits; and, illuminates a number of the indicators in proportion to the determined relationship.

The indicators are arranged in a plurality of groups. The groups include, for example, a central first color group, a second color group flanking the first color group, and a third color group flanking the second color group. The color groups respectively correspond to a first, a second and a third range of determined relationships. The first range corresponds to operating conditions within the operating limits. The second range corresponds to a caution range where the operating conditions approach the operating limits, and the third range corresponds to operating conditions exceeding operating limits.

The indicating means includes: (1) a thresholding means which determines within which range the determined relationship falls, (2) a degree means which determines the location within the range that the determined relationship falls, and (3) a voltage generating means for generating a voltage corresponding to the output of the thresholding means and the degree means. The indicating means further includes a driving means which illuminates the indicators in one of a dot and bar mode. In dot mode, an indicator disposed on each side of a middle indicator which corresponds to the generated voltage is illuminated. The higher the generated voltage, the farther from the middle indicator are the two illuminated indicators, called lead indicators. In bar mode, the lead indicators and all indicators disposed closer to the middle indicator are illuminated.

Other objects, features, and characteristics of the present invention; methods, operations, and functions of the related elements of the structure; combination of parts; and, economies of manufacture will become apparent from the following detailed description of the preferred embodiments and accompanying drawings, all of which form a part of this specification, wherein like reference numerals designate corresponding parts in the various figures.

DESCRIPTION OF THE PREFERRED EMBODIMENTS

Figure 1:
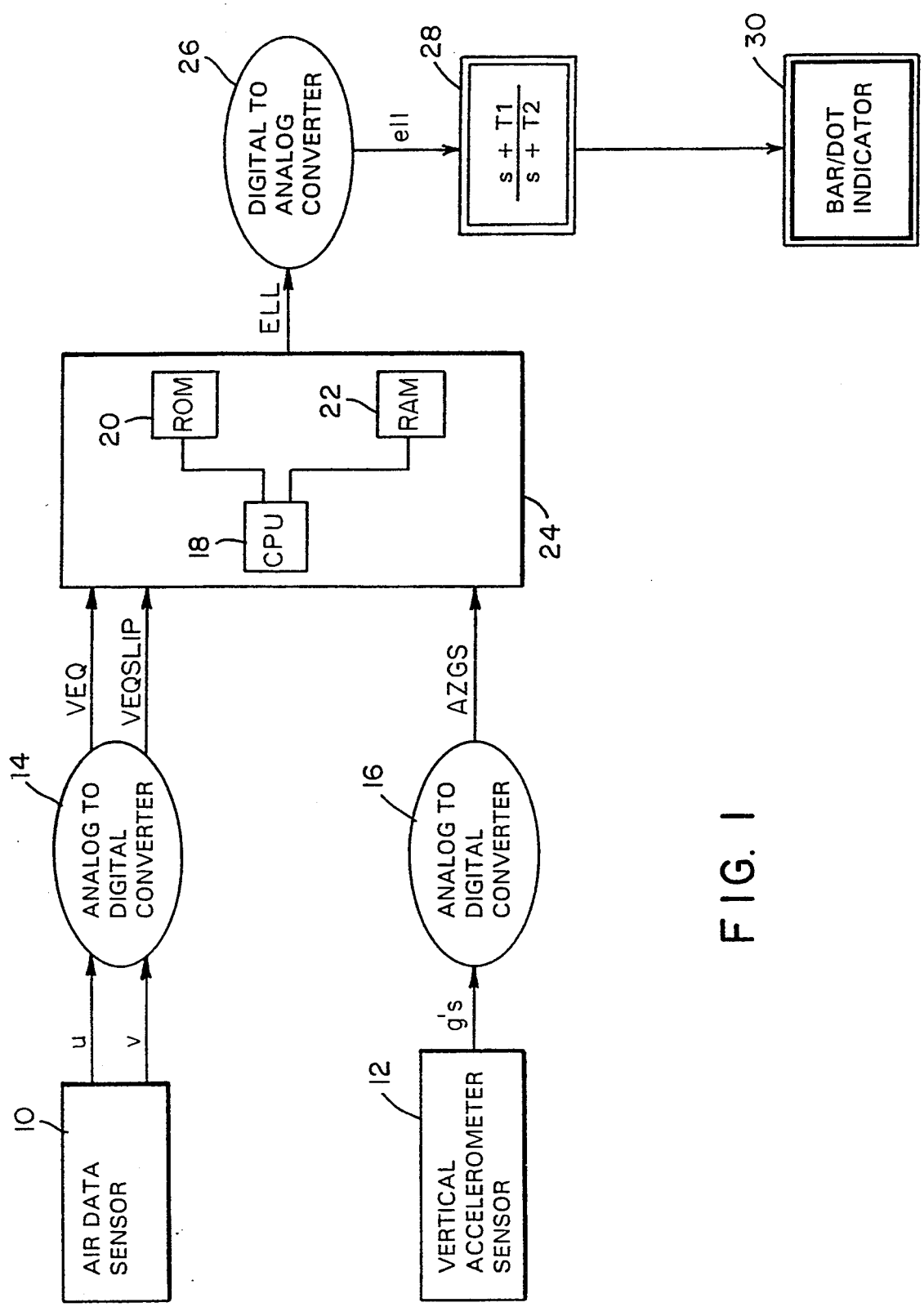
FIG. 1 is a block diagram of an embodiment of the maneuver envelope warning system according to the present invention.

FIG. 1 is a block diagram of an embodiment of the maneuver envelope warning system according to the present invention. An air data sensor 10 of the aircraft outputs a sensed forward velocity signal, u, and a sensed sideslip velocity signal, v, to analog to digital converter (ADC) 14. Air data sensor 10 can include a high airspeed and/or a low airspeed sensor. ADC 14 converts the analog sensor signals u and v to digital signals VEQ and VEQSLIP, respectively. A vertical accelerometer sensor 12 outputs a sensed vertical acceleration signal, g's, to ADC 16. ADC 16 converts the analog sensor signal g's to a digital signal AZGS.

Digital processor 24 includes a CPU 18, a ROM 20, and a RAM 22. VEQ, VEQSLIP, and AZGS, respectively, representing the sensed forward velocity, the sensed sideslip velocity, and the sensed vertical acceleration are stored in RAM 22. ROM 20 stores a program that instructs processor 24 to generate a voltage signal ELL based on VEQ, VEQSLIP and AZGS stored in RAM 22 and function tables stored in ROM 20. One program that generates voltage signal ELL follows this description of the invention.

Processor 24 uses function tables stored in ROM 20 to obtain operational limits for sideslip velocity and vertical acceleration corresponding to VEQ. The processor 24 then determines a relationship between one of the operating limit for sideslip velocity and VEQSLIP (sideslip relationship), and the operating limit for vertical acceleration and AZGS (vertical acceleration relationship). In a preferred embodiment of the present invention, detailed in the program at the end of the specification, the determined relationship is either a ratio of VEQSLIP to the operating limit for sideslip velocity (sideslip ratio), or a ratio of AZGS to the operating limit for vertical acceleration (vertical acceleration ratio). The greater of the vertical acceleration ratio and the sideslip ratio is taken as the determined relationship. Alternatively, a choice between using the sideslip ratio and the vertical acceleration ratio could be made user selectable.

Figure 4:
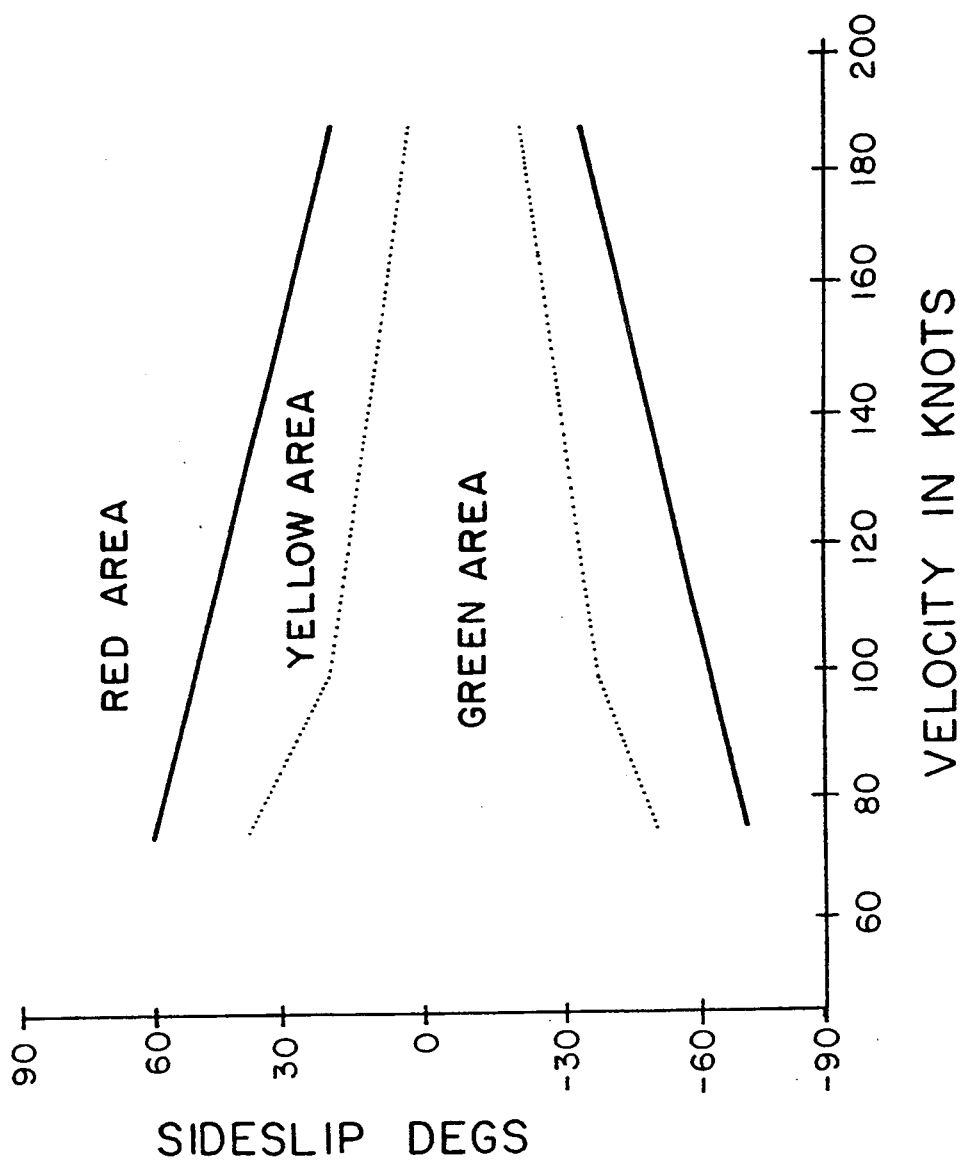
FIG. 4 is a graph illustrating a sideslip envelope.
Figure 5:
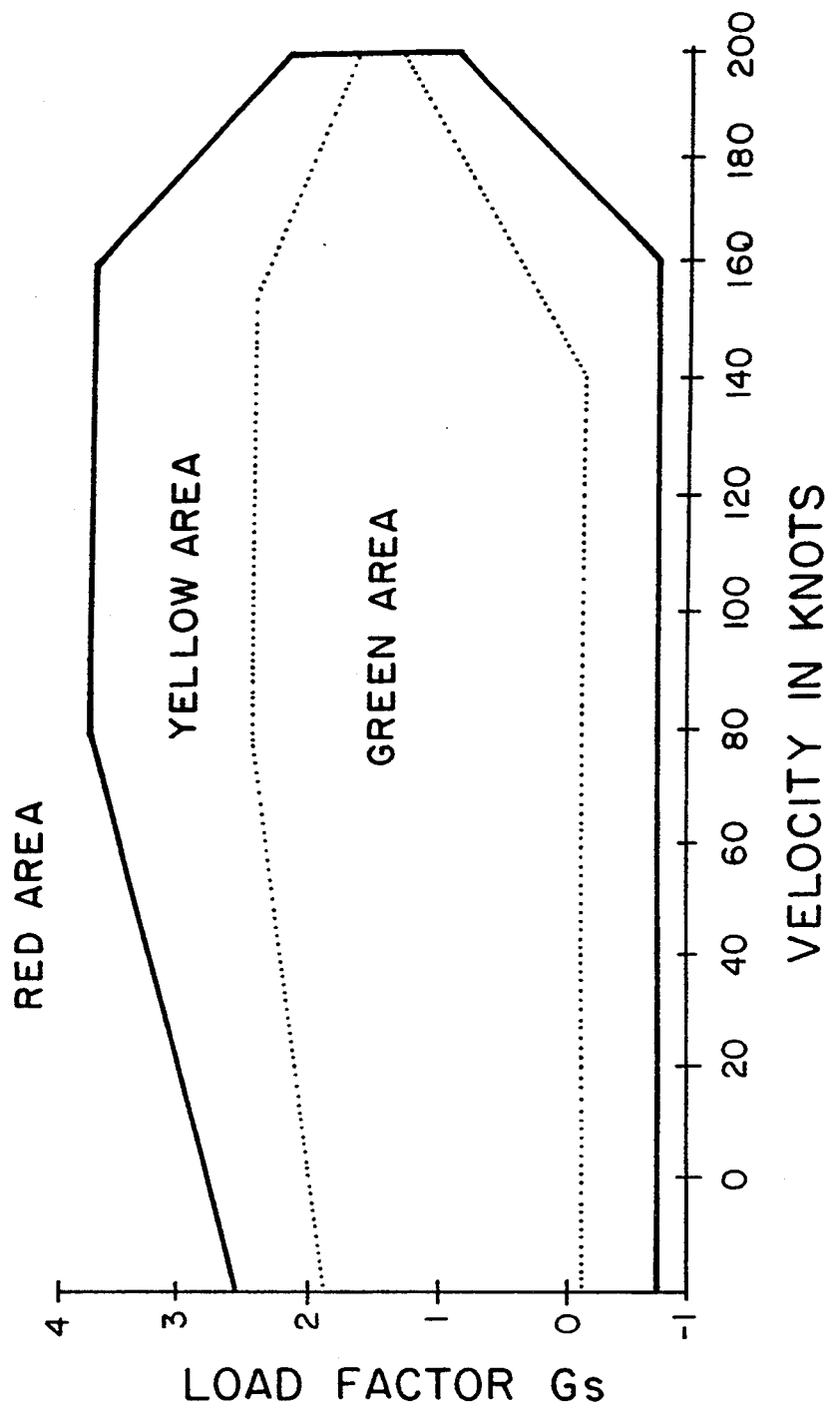
FIG. 5 is a graph illustrating a load factor envelope.

The processor 24 uses a sideslip envelope as shown in FIG. 4 to determine whether the determined relationship is within a green area, yellow area, and red area when the determined relationship is the sideslip relationship. Similarly, processor 24 uses a load factor envelope as shown in FIG. 5 to determine whether the determined relationship is within a green area, yellow area, and a red area when the determined relationship is the vertical acceleration relationship. The green area is an area where the sensed operational condition, sensed sideslip velocity or sensed vertical acceleration, is well within the operational limit. The yellow area is a caution range, where the sensed operational condition is approaching the operational limit. The red area is an area where the sensed operational condition exceeds the operational limit. Processor 24 generates a voltage signal ELL based on where within the green, yellow or red area the determined relationship falls. In the preferred embodiment, as the determined relationship increases, the voltage signal ELL increases.

A digital to analog converter (DAC) 26 converts the voltage signal ELL generated by processor 24 to an analog voltage signal ell. Depending on the processing speed of processor 24, a time delay can be incorporated in the program stored in ROM 20 to prevent changes in LED illumination from occurring too quickly for pilot assimilation. As an option, the time delay can be performed by a lead compensator 28 which filters the analog voltage signal ell generated by DAC 16. The filtered, voltage signal ell is then supplied to BAR/DOT indicator 30, shown schematically in FIG. 2.

Figure 3:
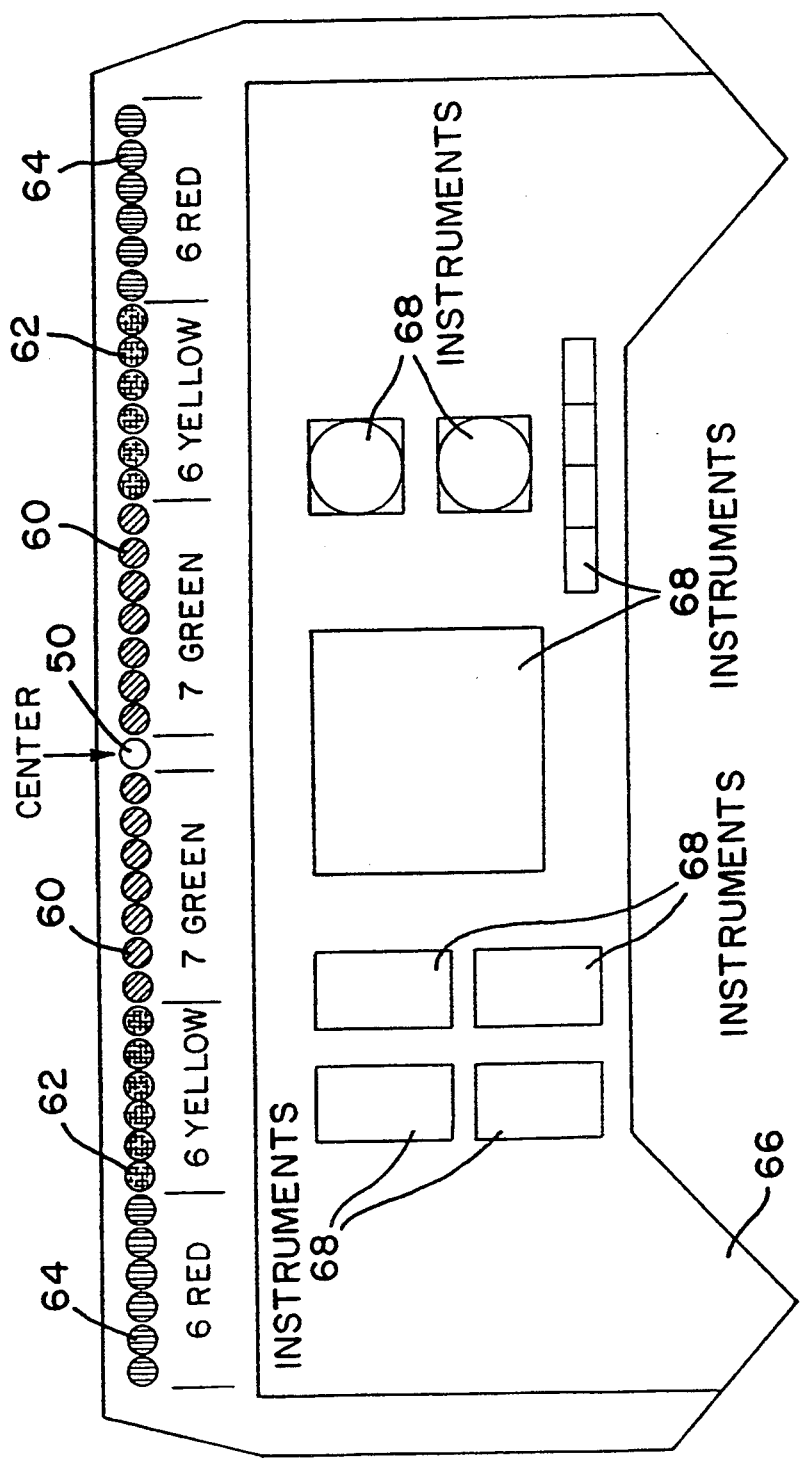
FIG. 3 schematically illustrates an array of LED indicators in accordance with the present invention.

BAR/DOT indicator 30 includes an indicator array of LEDs 46 and LED 50. LEDs 46 and LED 50 are arranged within a glare shield of an aircraft's instrument panel 66 as shown in FIG. 3. The instrument panel 66 having instruments 68. LEDs 46 are divided into three color groups, and arranged symmetrically about LED 50. LED 50 is green, and is illuminated as long as power is supplied to the BAR/DOT indicator 30. Flanking green LED 50 are fourteen green LEDs 60, seven on each side. LED 50 and LEDs 60 comprise a first group of LEDs and correspond to a determined relationship within the green area. Flanking the first group of LEDs is a second group of LEDs, LEDs 62, which correspond to a determined relationship within the yellow area. The twelve LEDs 62 are yellow, and six LEDs 62 flank each side of the first group of LEDs. Flanking the second group of LEDs is a third group of LEDs, red LEDs 64, which correspond to a determined relationship within the red area. Six red LEDs 64 flank the outer side of yellow LEDs 62. It is to be understood that the number of green LEDs 60, yellow LEDs 62, and red LEDs 64 is not limited to that described above, but could be varied arbitrarily. Furthermore, none of the instrument panel space is required for the indicator array of LEDs 46 and LED 50 because the indicator array of LEDs 46 and LED 50 can be arranged within, under or on an aircraft's glare shield. Additionally, instruments rendered redundant by the indicator array of LEDs 46 and LED 50 can be eliminated. Thus, the economies of space for instrument panel 66 are improved, and the engineering design thereof simplified. The orientation of the indicator light array of LEDs 46 and LED 50 with respect to a pilot does not require the use of a pilot's central vision, since a pilot can detect the changes of color and motion of illumination of the indicator array of LEDs 46 and LED 50 through his peripheral vision.

In a preferred embodiment, BAR/DOT indicator 30 can operate in either a bar mode or dot mode by operation of BAR/DOT mode user selectable switch 48. In dot mode, the BAR/DOT indicator 30 illuminates an LED 46 on either side of LED 50 corresponding to voltage signal ell. Depending on the area within which the predetermined relationship falls (green, yellow or red), BAR/DOT indicator 30, in response to voltage signal ell, illuminates a corresponding green, yellow, or red LED 46 on each side of LED 50. Further, depending on where in a given area the determined relationship falls, an LED within the corresponding color group is illuminated on each side of LED 50. As described above, and as described in more detail below, BAR/DOT indicator 30 illuminates LEDs 46 in proportion to the determined relationship. As voltage signal ell increases, LEDs 46 proportionally farther from LED 50 are symmetrically illuminated. For example, if the third green LED 60 to the left and right of LED 50 are illuminated in response to voltage signal ell and voltage signal ell increases by a sufficient amount, the fourth green LED 60 to left and right of LED 50 will be illuminated and the third LED 60 to the left and right of LED 50 will be turned off.

The BAR/DOT indicator 30 also operates in a manner similar to that of the dot mode. However, in bar mode, the two LEDs 46 that would be illuminated in dot mode (called the lead indicators), and all the LEDs 46 arranged closer to LED 50 than the lead indicators are illuminated.

Figure 2:
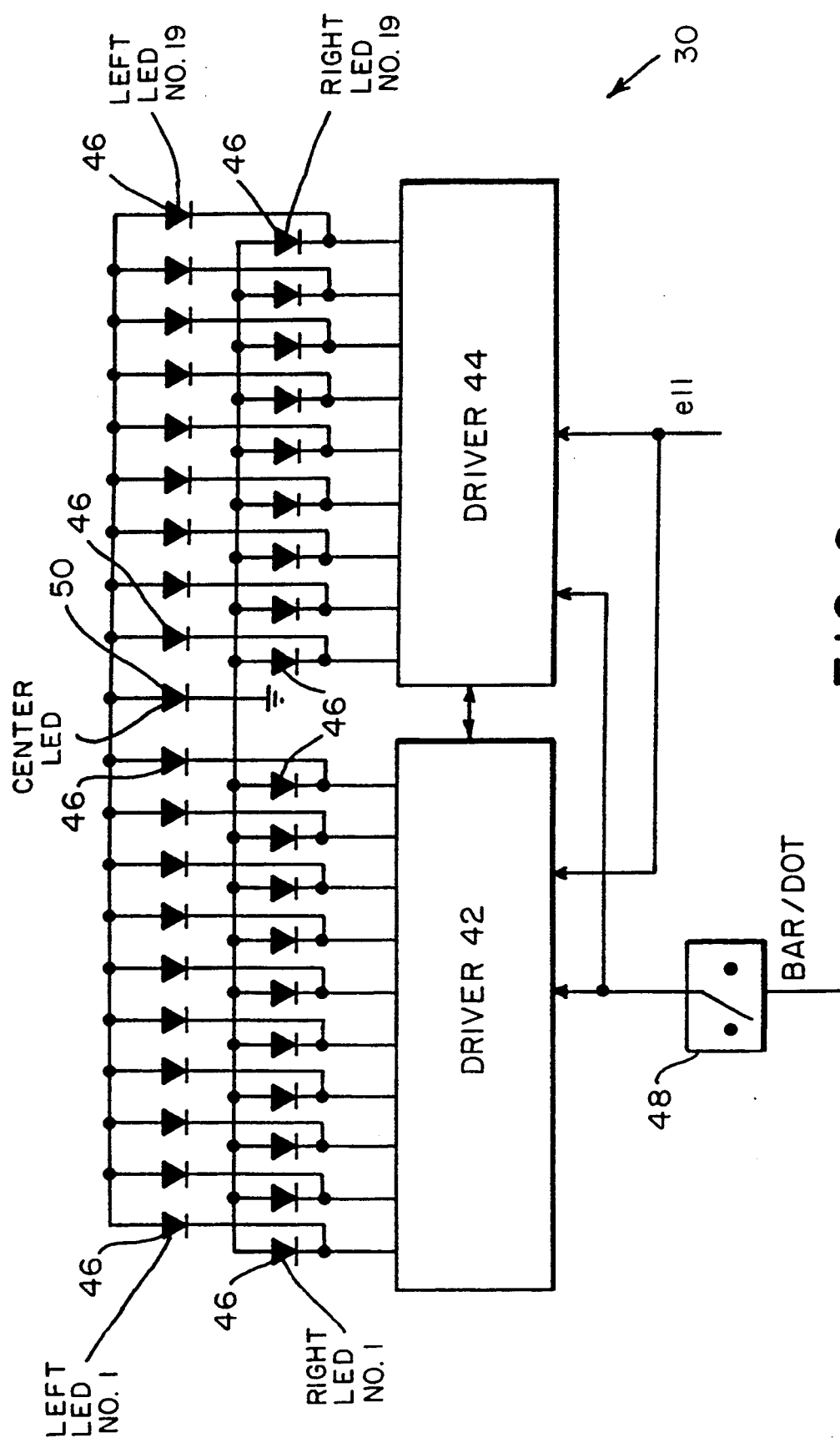
FIG. 2 is a schematic diagram of a bar/dot indicator usable with the present invention.

As shown in FIG. 2, in a preferred embodiment of the present invention, drivers 42 and 44 drive the plurality of LEDs 46. Drivers 42 and 44, such as LM3914 Dot/-Bar Display Driver from National Semiconductor, drive twenty LEDs 46 and eighteen LEDS 46, respectively. Driver 42 drives the fourteen green LEDs 60, and the first three yellow LEDs 62 flanking green LEDs 60. Driver 44 drives the remaining three outer yellow LEDs 62 flanking the green LEDs 60 and the twelve red LEDs 64. The first LEDs 46, i.e., the first green LEDs 60 flanking LED 50 in FIG. 3, are labeled LFT. LED No. 1 and RT. LED No. 1 in FIG. 2. LFT. and RT. LED No. 1 are connected to driver 42, as are the sequentially outward next nine LEDs 46. The last LEDs 46, i.e., the last red LEDs 64 flanking LED 50, are labeled LFT. LED No. 19 and RT. LED No. 19 in FIG. 2. LFT. and RT. LED No. 19 are connected to driver 44, as are the sequentially inward, next seven LEDs 46.

The embodiment discussed above uses a symmetrical array of LEDs where the illuminated LEDs expand out from the center as the output voltage ell increases. However, the BAR/DOT indicator is not limited to this arrangement. The LEDs can be arranged in different patterns, with different lighting schemes. For instance, instead of the straight line arrangement shown in FIG. 3, the LED array can be arranged in a curved or angled line. Additionally, the three color schemes above can be altered or modified, and a rheostat can be added to the BAR/DOT indicator 30 to control the intensity of the LEDs. Furthermore, filters can be added to make the indicator array of LEDs 46 and LED 50 night vision goggle compatible.

While the invention has been described in connection with what is presently considered the most practical and preferred embodiments, it is to be understood that the invention is not limited to the disclosed embodiments; but, on the contrary, is intended to cover various modifications and equivalent arrangements included within the spirit and scope of the appended claims.

I claim:
1. A maneuver envelope warning system for an aircraft having operating limits, the system comprising:
sensor means for sensing operating conditions of the aircraft;
processing means for determining a relationship between the sensed operating conditions and the operating limits, said processing means including thresholding means for determining whether the determined relationship falls within one of a first range, a second range, and a third range, and for providing an output signal responsive to the determination, said processing means further including a voltage generating means for generating a voltage corresponding to a location of the determined relationship within the first range, second range and third range;
an array of indicators corresponding to the operating limits, said indicators of said array, being of a first color and located in a middle of the array, indicators being of a second color flanking the indicators of the first color, and the indicators being of a third color flanking the indicators of the second color; and
indicating means for illuminating a number of the indicators in proportion to the determined relationship, said indicating means including driving means for receiving the output signal, for illuminating at least one of the indicators of the first color when the determined relationship falls within the first range, for illuminating at least two of the indicators of the second color when the determined relationship falls within the second range, and for illuminating at least two of the indicators of the third color when the determined relationship falls within the third range, said driving means including means for symmetrically driving at least two indicators lying on either side of the middle of the array based on the generated voltage, the driven indicators disposed farthest from the middle of the linear array being called the lead indicators, and further wherein the indicating means includes user selectable means for controlling the driving means to one of (a) only drive the lead indicators and (b) drive the lead indicators and indicators disposed closer to the middle of the array than the lead indicators.

* * * * *